US012236841B2

(12) United States Patent
Xu

(10) Patent No.: US 12,236,841 B2
(45) Date of Patent: Feb. 25, 2025

(54) PIXEL CIRCUIT AND DISPLAY PANEL FOR IMPROVING CONTROL ACCURACY OF LIGHT-EMITTING TIME IN PULSE WIDTH DRIVING MODE

(71) Applicant: TCL CHINA STAR OPTOELECTRONICS TECHNOLOGY CO., LTD., Guangdong (CN)

(72) Inventor: Jian Xu, Guangdong (CN)

(73) Assignee: TCL China Star Optoelectronics Technology Co., Ltd., Guangdong (CN)

( * ) Notice: Subject to any disclaimer, the term of this patent is extended or adjusted under 35 U.S.C. 154(b) by 0 days.

(21) Appl. No.: 17/622,803

(22) PCT Filed: Dec. 17, 2021

(86) PCT No.: PCT/CN2021/139318
§ 371 (c)(1),
(2) Date: Jun. 22, 2023

(87) PCT Pub. No.: WO2023/108650
PCT Pub. Date: Jun. 22, 2023

(65) Prior Publication Data

US 2024/0029623 A1 Jan. 25, 2024

(30) Foreign Application Priority Data

Dec. 13, 2021 (CN) ......................... 202111521974.0

(51) Int. Cl.
*G09G 3/20* (2006.01)
*G09G 3/32* (2016.01)

(52) U.S. Cl.
CPC ............. *G09G 3/2096* (2013.01); *G09G 3/32* (2013.01); *G09G 2300/0842* (2013.01);
(Continued)

(58) Field of Classification Search
CPC ..... G09G 3/2003–2014; G09G 3/2077; G09G 3/2081; G09G 3/2092; G09G 3/2096;
(Continued)

(56) References Cited

U.S. PATENT DOCUMENTS 10,395,590 B1 8/2019 Lin et al.
2001/0052890 A1* 12/2001 Miyazawa ........... G09G 3/3659
345/89

(Continued)

FOREIGN PATENT DOCUMENTS

CN 1820295 A 8/2006
CN 101964172 A 2/2011

(Continued)

OTHER PUBLICATIONS

EDN, "Add a Schmitt-trigger function to CPLDs, FPGAs, and applications", Oct. 13, 2005, https://www.edn.com/add-a-schmitt-trigger-function-to-cplds-fpgas-and-applications/ (Year: 2005).*

(Continued)

*Primary Examiner* — Nathan Danielsen
(74) *Attorney, Agent, or Firm* — PV IP PC; Wei Te Chung

(57) ABSTRACT

A pixel circuit and a display panel are provided. The pixel circuit includes a driving transistor T2 and a pulse width driving module. The pulse width driving module includes a display time control unit, an electrical potential modulation unit, and a Schmitt trigger. By connecting the Schmitt trigger in series between an output terminal of the electrical potential modulation unit and a control terminal of the display time control unit, the driving transistor T2 can be turned off more quickly, thereby accurately controlling the display time or light-emitting time of the pixel circuit.

18 Claims, 5 Drawing Sheets

(52) U.S. Cl.
CPC ..... *G09G 2310/06* (2013.01); *G09G 2310/08* (2013.01); *G09G 2320/045* (2013.01)

(58) Field of Classification Search
CPC ....... G09G 3/32–3291; G09G 2300/08; G09G 2300/0809; G09G 2300/0828; G09G 2300/0842–0857; G09G 2310/0243; G09G 2310/0259; G09G 2310/0262; G09G 2310/06; G09G 2310/066; G09G 2310/08; G09G 2320/0233; G09G 2320/045
See application file for complete search history.

(56) References Cited

U.S. PATENT DOCUMENTS

| | | | | |
|---|---|---|---|---|
| 2004/0100304 | A1* | 5/2004 | Kawase | G09G 3/3241 326/86 |
| 2006/0170373 | A1 | 8/2006 | Yang | |
| 2007/0080905 | A1 | 4/2007 | Takahara | |
| 2007/0109285 | A1 | 5/2007 | Garverick et al. | |
| 2015/0015563 | A1* | 1/2015 | Leonid | G09G 3/3233 345/212 |
| 2016/0125790 | A1 | 5/2016 | Zehner et al. | |
| 2019/0325806 | A1* | 10/2019 | Hashimoto | G09G 3/2014 |
| 2021/0065614 | A1* | 3/2021 | Kim | G09G 3/32 |
| 2021/0158748 | A1 | 5/2021 | Kawae et al. | |
| 2021/0312856 | A1* | 10/2021 | Jeong | G09G 5/18 |

FOREIGN PATENT DOCUMENTS

| | | | |
|---|---|---|---|
| CN | 101976555 | A | 2/2011 |
| CN | 202799274 | U | 3/2013 |
| CN | 103810962 | A | 5/2014 |
| CN | 107068036 | A | 8/2017 |
| CN | 109859681 | A | 6/2019 |
| CN | 209785529 | U | 12/2019 |
| CN | 111369935 | A | 7/2020 |
| CN | 111477165 | A | 7/2020 |
| CN | 111489687 | A | 8/2020 |
| CN | 111739494 | A | 10/2020 |
| CN | 112927651 | A | 6/2021 |
| CN | 113096589 | A | 7/2021 |
| CN | 113707079 | A | 11/2021 |
| WO | 2012032282 | A1 | 3/2012 |
| WO | 2014068017 | A1 | 5/2014 |

OTHER PUBLICATIONS

International Search Report in International application No. PCT/CN2021/139318, mailed on Sep. 14, 2022.
Written Opinion of the International Searching Authority in International application No. PCT/CN2021/139318, mailed on Sep. 14, 2022.
Notification to Grant Patent Right for Invention issued in corresponding Chinese Patent Application No. 202111521974.0 dated Jul. 12, 2022, pp. 1-6.
«Optoelectronic Technology»The first phase Dec. 31, 2020 Design of a PWM Circuit for Silicon-based OLED Driving Chip QIN Changbing, Etc. p. 44-47,51.

* cited by examiner

PIXEL CIRCUIT AND DISPLAY PANEL FOR IMPROVING CONTROL ACCURACY OF LIGHT-EMITTING TIME IN PULSE WIDTH DRIVING MODE

FIELD OF INVENTION

The present application relates to display technologies, and more particularly, to a pixel circuit and a display panel.

BACKGROUND OF INVENTION

The driving methods of display technology include pulse amplitude modulation (PAM), pulse width modulation (PWM) and a mixture of the two. The PWM driving method has the advantages of constant current, high luminous efficiency, and low grayscale display quality. Therefore, PWM or PWM-based hybrid driving methods have been extensively studied.

The pixel circuit shown in FIG. 1 adopts a pulse width modulation (PWM) driving mode. The display time of the pixel circuit can be controlled by the signal SPWM, but the signal SPWM requires a higher frequency, when it is generated by a driver integrated circuit (IC), the gate driver IC is required to have high performance, and a number of rows of pixel circuits that the gate driver IC can drive is small.

As shown in FIG. 2, an operating process of the pixel circuit in FIG. 1 includes a preparation stage S1 and a light-emitting stage S2. In the preparation stage S1, an electrical potential V-G at point G and an electrical potential V-SPWM of the signal SPWM are both low electrical potentials. Therefore, light-emitting current I-LED does not flow in the light-emitting device LED. In the light-emitting stage S2, when the electrical potential V-G at point G is high, a light-emitting current I-LED flows in the light-emitting device LED. However, when an electrical potential V-SPWM of the signal SPWM is high, the light-emitting current I-LED will stop flow through the light-emitting device LED.

The pixel circuit shown in FIG. 3 adopts another PWM driving method. By initializing an electrical potential of point A to a corresponding initial voltage, and using a coupling effect of the capacitor C2, an electrical potential of point A can be increased at a uniform speed. The time required for the electrical potential at point A to rise from different initial voltages to the threshold voltage of the transistor T4 are different, and the time that the transistor T4 turned on or conducted are also different, and the display time or light-emitting time of the pixel circuit are also different. Due to the uniform change of the electrical potential at point A, the transistor T4 and the transistor T2 are slowly turned off or close as shown in FIG. 4, which makes it difficult to accurately control the light-emitting time.

As shown in FIG. 4, the operating process of the pixel circuit in FIG. 3 includes a preparation stage S3 and a light-emitting stage S4. In the preparation stage S3, an electrical potential V-G of point G and an electrical potential V-Sweep of signal Sweep potential V-Sweep are both low electrical potentials. Therefore, the light-emitting current I-LED does not flow through the light-emitting device LED. In the light-emitting stage S4, when the potential VG at the point G is at the high electrical potential, the light-emitting current I-LED flows through the light-emitting device LED. However, as the electrical potential V-Sweep of the signal Sweep gradually rises, there is a slow drop in the electrical potential VG at the point G, which causes the light-emitting current I-LED to not stop immediately, which makes it difficult to precisely control the light-emitting time of the pixel circuit.

At the same time, due to differences in the threshold voltage of the transistor T4 in different pixel circuits, in order to display uniformity, a more complicated circuit structure is needed to compensate the threshold voltage of the transistor T4.

It should be noted that the above-mentioned introduction of the background technology is only for a purpose of facilitating a clear and complete understanding of the technical solutions of the present application. Therefore, it cannot be considered that the above-mentioned technical solutions involved are known to those skilled in the art just because it appears in the background art of the present application.

SUMMARY OF INVENTION

The present application provides a pixel circuit and a display panel to improve a control accuracy of the light-emitting time in a pulse width driving mode.

In a first aspect, the present application provides a pixel circuit, which includes a driving transistor T2 and a pulse width driving module; and the pulse width driving module electrically connected to a gate electrode of the driving transistor T2, wherein the pulse width driving module includes a display time control unit, an electrical potential modulation unit, and a Schmitt trigger; wherein one terminal of the display time control unit is electrically connected to the gate electrode of the driving transistor T2, and wherein another terminal of the display time control unit is configured to receive a first reference signal and is configure to turn off the driving transistor T2; and wherein an input terminal of the Schmitt trigger is electrically connected to the output terminal of the electrical potential modulation unit, and wherein an output terminal of the Schmitt trigger is electrically connected to a control terminal of the display time control unit.

In some of the embodiments, the Schmitt trigger includes an inverter INV1, an inverter INV2, and a resistor R2. An input terminal of the inverter INV1 is electrically connected to the output terminal of the electrical potential modulation unit; wherein an input terminal of the inverter INV2 is electrically connected to an output terminal of the inverter INV1, and wherein the output terminal of the inverter INV2 is electrically connected to the control terminal of the display time control unit; and one terminal of the resistor R2 is electrically connected to the input terminal of the inverter INV1, and another terminal of the resistor R2 is electrically connected to the output terminal of the inverter INV2.

In some of the embodiments, the Schmitt trigger further includes a resistor R1, wherein one terminal of the resistor R1 is electrically connected to the output terminal of the electrical potential modulation unit, and wherein another terminal of the resistor R1 is electrically connected to the input terminal of the inverter INV1.

In some of the embodiments, the inverter INV1 comprises a transistor M1 and a transistor M2; wherein one of a source electrode and a drain electrode of the transistor M1 is electrically connected to a gate electrode of the transistor M1, and is configured to receive a high electrical potential signal; and wherein one of a source electrode and a drain electrode of the transistor M2 is electrically connected to another one of the source electrode and the drain electrode of the transistor M1 and the input terminal of the inverter INV2, and wherein a gate electrode is electrically connected to the output terminal of the electrical potential modulation unit, and another one of the source electrode and the drain electrode of the transistor M2 is configured to receive a first reference signal.

In some of the embodiments, the inverter INV2 includes a transistor M3 and a transistor M4, wherein one of a source electrode and a drain electrode of the transistor M3 is electrically connected to a gate electrode of the transistor M3, and is configured to receive the high electrical potential signal; and wherein one of a source electrode and a drain electrode of the transistor M4 is electrically connected to another one of the source electrode and the drain electrode of the transistor M3 and the control terminal of the display time control unit, and wherein a gate electrode of the transistor M4 is electrically connected to one of the source electrode and the drain electrode of the transistor M2, and wherein another one of the source electrode and the drain electrode of the transistor M4 is configured to receive the first reference signal.

In some of the embodiments, the display time control unit comprises a transistor T4, and one of a source electrode and a drain electrode of the transistor T4 is electrically connected to the gate electrode of the driving transistor T2, and wherein another one of the source electrode and the drain electrode of the transistor T4 is configured to access the first reference signal, and wherein a gate electrode of the transistor T4 is electrically connected to the output terminal of the Schmitt trigger.

In some of the embodiments, the potential modulation unit comprises a capacitor C2, one terminal of the capacitor C2 is electrically connected to the input terminal of the Schmitt trigger, and another terminal of the capacitor C2 is configured to receive a triangle wave control signal.

In some of the embodiments, the potential modulation unit further comprises a transistor T5, and wherein one of a source electrode and a drain electrode of the transistor T5 is configured to receive an electrical potential setting signal, and a gate electrode of transistor T5 is configured to receive a pulse width control signal.

In some of the embodiments, the pixel circuit further includes a transistor T1, a transistor T3, a capacitor C1, and a light-emitting device D1; wherein one of a source electrode and a drain electrode of the transistor T1 is configured to receive a data signal, and wherein a gate electrode of the transistor T1 is configured to receive a pulse amplitude control signal, and wherein another one of the source electrode and the drain electrode of the transistor T1 is electrically connected to the gate electrode of the driving transistor T2; wherein one of a source electrode and a drain electrode of the transistor T3 is configured to receive the second reference signal, and wherein the gate electrode of the transistor T3 is configured to receive the pulse amplitude control signal, and wherein another one of the source electrode and the drain electrode of the transistor T3 is electrically connected to the source electrode of the driving transistor T2; wherein one terminal of the capacitor C1 is electrically connected to the gate electrode of the driving transistor T2, and another terminal of the capacitor C1 is electrically connected to the source electrode of the driving transistor T2; and wherein an anode of the light-emitting device D1 is electrically connected to the source electrode of the driving transistor T2, and wherein a cathode of the light-emitting device D1 is configured to connect a negative power supply signal; wherein the drain electrode of the driving transistor T2 is configured to receive a positive power supply signal.

In a second aspect, the present application provides a display panel, which includes the pixel circuit in at least one of the above embodiments, the pixel circuit further includes a light-emitting chip, and wherein the Schmitt trigger is integrated in the light-emitting chip.

The pixel circuit and the display panel provided by the present application, by connecting the Schmitt trigger in series between the output terminal of the potential modulation unit and the control terminal of the display time control unit, can more quickly turn on the display time control unit to turn off the driving transistor T2, in turn, can more accurately control the display time or light-emitting time of the pixel circuit.

DESCRIPTION OF FIGURES

The following detailed description of the specific implementations of the present application in conjunction with the accompanying figures will make the technical solutions and other beneficial effects of the present application obvious.

DETAILED DESCRIPTION OF EMBODIMENTS

The technical solutions in the embodiments of the present application will be clearly and completely described below in conjunction with the figures in the embodiments of the present application. Obviously, the described embodiments are only a part of the embodiments of the present application, rather than all the embodiments. Based on the embodiments in the present application, all other embodiments obtained by those skilled in the art without inventive steps shall fall within a protection scope of the present application.

Figure 5:
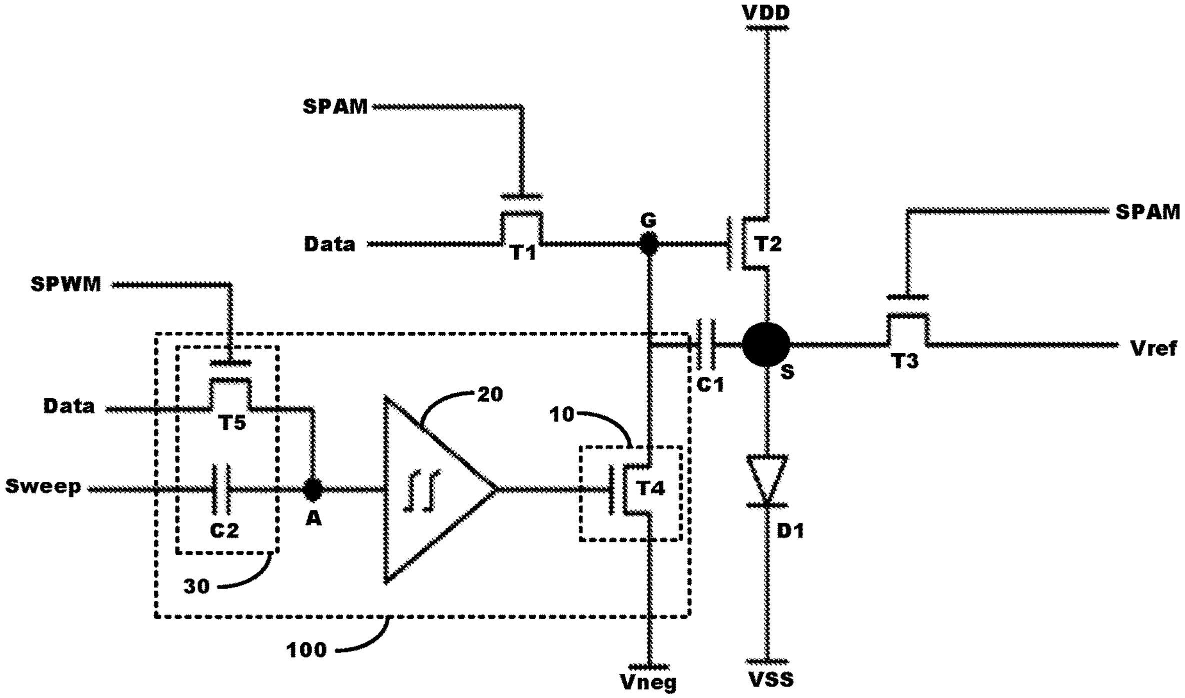
FIG. 5 is a schematic structural diagram of a pixel circuit provided by one embodiment of the present application.

In view of the above-mentioned technical problem that it is difficult to accurately control the light-emitting time in a pulse width driving mode, this embodiment provides a pixel circuit. Please refer to FIGS. 5 to 10. As shown in FIG. 5, the pixel circuit includes a driving transistor T2 and a pulse width driving module 100. The pulse width driving module 100 is electrically connected to a gate electrode of the driving transistor T2. The pulse width driving module 100 includes a display time control unit 10, an electrical potential modulation unit 30, and a Schmitt trigger 20. One terminal of the display time control unit is electrically connected to the gate electrode of the driving transistor T2. Another terminal of the display time control unit 10 is configured to receive a first reference signal Vneg and configured to turn off the driving transistor T2. An input terminal of the Schmitt trigger 20 is electrically connected to the output terminal of the electrical potential modulation unit 30, and wherein an output terminal of the Schmitt trigger 20 is electrically connected to a control terminal of the display time control unit 10.

It is understandable that the pixel circuit provided in this embodiment can turn on the display time control unit 10 and turn off the driving transistor T2 more quickly by connecting the Schmitt trigger 20 in series between the output terminal of the electrical potential modulation unit 30 and the control terminal of the display time control unit 10, to more accurately control the display time or light-emitting time of the pixel circuit.

In one of the embodiments, the display time control unit 10 includes a transistor T4. One of a source electrode and a drain electrode of the transistor T4 is electrically connected to the gate electrode of the driving transistor T2. Another one of the source electrode and the drain electrode of the transistor T4 is configured to receive the first reference signal Vneg. The gate electrode of the transistor T4 is electrically connected to the output terminal of the Schmitt trigger 20.

In one of the embodiments, the electrical potential modulation unit 30 includes a capacitor C2, one terminal of the capacitor C2 is electrically connected to the input terminal of the Schmitt trigger 20, and another terminal of the capacitor C2 is configured to receive the triangular wave control signal Sweep.

In one of the embodiments, the electrical potential modulation unit 30 further includes a transistor T5. One of a source electrode and a drain electrode of the transistor T5 is configured to receive an electrical potential setting signal, and a gate electrode of the transistor T5 is configured to receive the pulse width control signal SPWM. The electrical potential setting signal may be, but not limited to, data signal Data, and may also be other signals with suitable electrical potential.

As shown in FIG. 5, in one of the embodiments, the pixel circuit further includes a transistor T1, a transistor T3, a capacitor C1, and a light-emitting device D1. One of a source electrode and a drain electrode of the transistor T1 is configured to receive the data signal Data. A gate electrode of the transistor T1 is configured to receive the pulse amplitude control signal SPAM. Another one of the source electrode and the drain electrode of the transistor T1 is electrically connected to the gate electrode of the driving transistor T2. One of a source electrode and a drain electrode of the transistor T3 is configured to receive a second reference signal Vref, A gate electrode of the transistor T3 is configured to receive the pulse amplitude control signal SPAM. Another one of the source electrode and the drain electrode of the transistor T3 is electrically connected to the source electrode of the driving transistor T2. A terminal of the capacitor C1 is electrically connected to the gate electrode of the driving transistor T2. Another terminal of the capacitor C1 is electrically connected to the source electrode of the driving transistor T2. An anode of the light-emitting device D1 is electrically connected to the source electrode of the driving transistor T2. A cathode of the light-emitting device D1 is configured to receive the negative power signal VSS. The drain electrode of the driving transistor T2 is configure to receive the positive power signal VDD.

Figure 6:
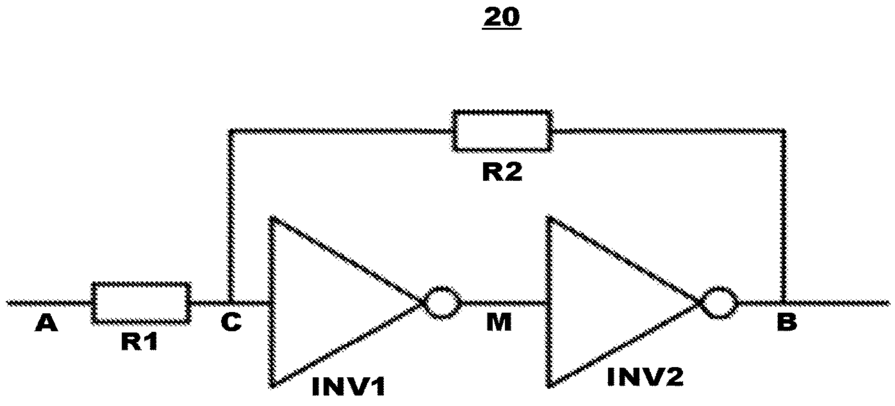
FIG. 6 is a schematic circuit diagram of a Schmitt trigger 20 shown in FIG. 5.

In one of the embodiments, as shown in FIG. 6, the Schmitt trigger 20 includes an inverter INV1, an inverter INV2, and a resistor R2. An input terminal of the inverter INV1 is electrically connected to an output terminal of the electrical potential modulation unit 30. An input terminal of the inverter INV2 is electrically connected to an output terminal of the inverter INV1. An output terminal of the inverter INV2 is electrically connected to the control terminal of the display time control unit 10. One terminal of the resistor R2 is electrically connected to the input terminal of inverter INV1. Another terminal of the resistor R2 is electrically connected to the output terminal of the inverter INV2.

It is understandable that, in this embodiment, since positive feedback is formed between the input terminal of the inverter INV1 and the output terminal of the inverter INV2 through the resistor T2, an electrical potential at point B can rise at a faster rate, to turn on the transistor T4 with a more precise time.

In one of the embodiments, the Schmitt trigger 20 further includes a resistor R1. One terminal of the resistor R1 is electrically connected to an output terminal of the electrical potential modulation unit 30, and another terminal of the resistor R1 is electrically connected to the input terminal of the inverter INV1.

It should be noted that the resistor R1 can be adapted to the electrical potential of point C, to make the inverter INV1 can be configured to receive different electrical potentials of point C.

It takes a certain time for a single inverter to switch states. When the Schmitt trigger 20 switches between states, there is a positive feedback process: an electrical potential VA at point A increased, an electrical potential VC at point C also increased accordingly, an electrical potential VM at point M decreased accordingly, an electrical potential VB at point B increased accordingly, and an electrical potential VC at point C also increased accordingly. Due to the above-mentioned positive feedback process, the electrical potential VB at the point B can change rapidly, to make the waveform of the electrical potential VB at the point B is infinitely close to a square wave, so that light-emitting time of the pixel circuit can be controlled more accurately.

Figure 7:
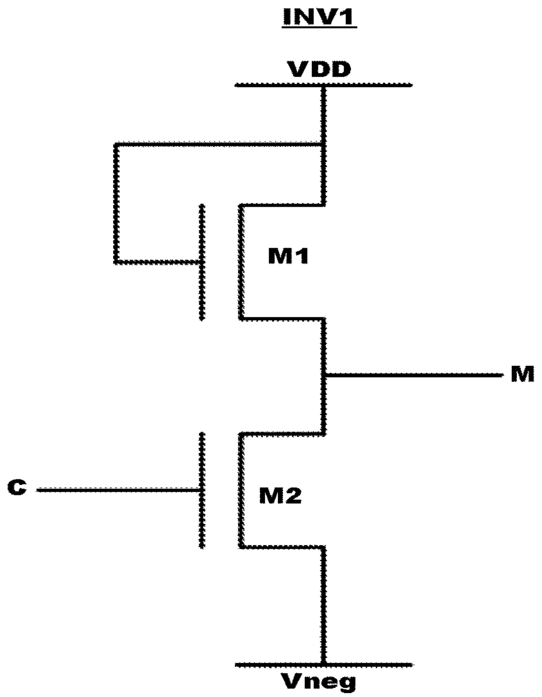
FIG. 7 is a schematic circuit diagram of an inverter INV1 shown in FIG. 6.

In one of the embodiments, as shown in FIG. 7, the inverter INV1 includes a transistor M1 and a transistor M2. One of a source electrode and a drain electrode of the transistor M1 is electrically connected to a gate electrode of the transistor M1 and is configured to receive a high electrical potential signal. One of a source electrode and a drain electrode of the transistor M2 is electrically connected to another one of the source electrode and the drain electrode of the transistor M1 and the input terminal of the inverter INV2. A gate electrode of the transistor M2 is electrically connected to the output terminal of the electrical potential modulation unit 30. Another terminal of the source electrode and the drain electrode of the transistor M2 is configured to receive the first reference signal Vneg.

The high electrical potential signal may be a power positive signal VDD. The first reference signal Vneg may also be a power negative signal VSS.

Figure 8:
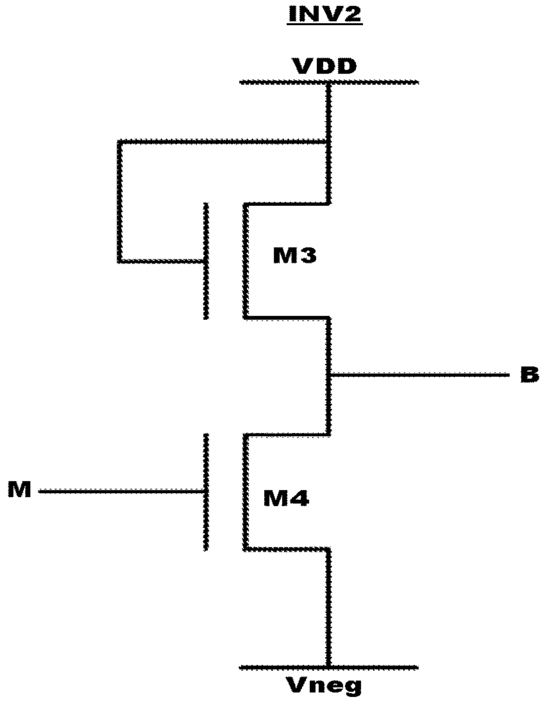
FIG. 8 is a schematic circuit diagram of an inverter INV2 shown in FIG. 6.

In one of the embodiments, as shown in FIG. 8, the inverter INV2 includes a transistor M3 and a transistor M4. One of a source electrode and a drain electrode of the transistor M3 is electrically connected to a gate electrode of the transistor M3 and is configured to receive a high electrical potential signal. One of the source electrode and the drain electrode of the transistor M4 and the another one of the source electrode and the drain electrode of the transistor M3 are electrically connected to the control terminal of the display time control unit 10. The gate electrode of the transistor M4 is electrically connected to the one of the source electrode and the drain electrode of the transistor M2

Another one of the source electrode and the drain electrode of the transistor M4 is configured to receive the first reference signal Vneg.

Figure 9:
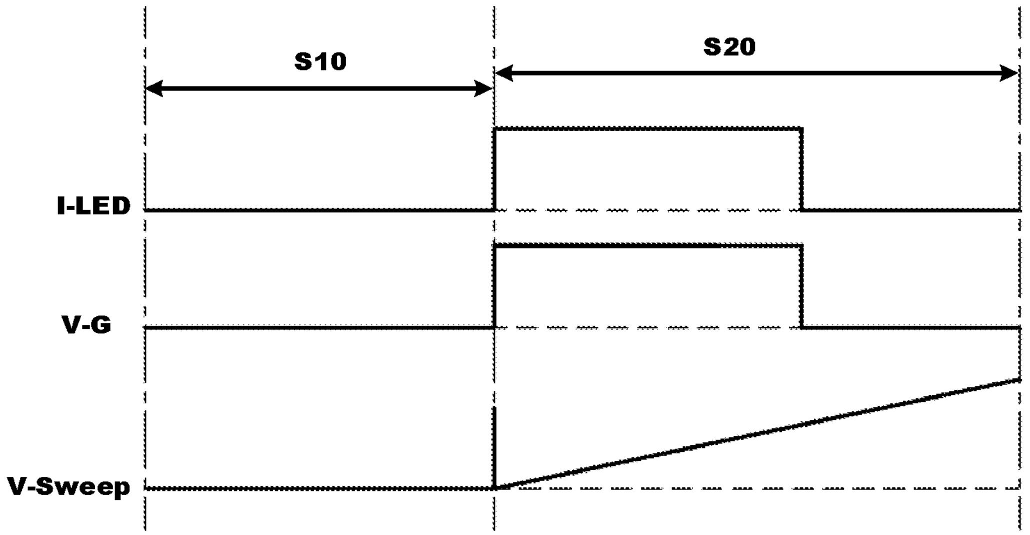
FIG. 9 is a time sequence diagram of the pixel circuit shown in FIG. 5.

As shown in FIGS. 5 and 9, based on a high hysteresis characteristic of the Schmitt trigger 20, the PWM driving mode can be realized by using the triangular wave control signal Sweep. Specifically, an operating process of the pixel circuit shown in FIG. 5 in one frame includes a preparation stage S10 and a display stage S20. In the preparation stage S10, an electrical potential VG at point G and an electrical potential V-Sweep of the triangular wave control signal Sweep are both at a low electrical potential. At this time, no light-emitting current I-LED flows in the light-emitting device D1, and the light-emitting device D1 remains in the off state. In the display stage S20, the electrical potential VG at point G jumps from a low electrical potential to a high electrical potential, the driving transistor T2 is turned on, and the light-emitting device D1 lights up due to the light-emitting current I-LED flowing in the light-emitting device D1. With the electrical potential V-Sweep of the triangular wave control signal Sweep gradually increases, through the coupling effect of the capacitor C2, the electrical potential VA at point A also gradually increases. When VA is greater than the forward threshold voltage of the Schmitt trigger 20, the output electrical potential of the Schmitt trigger 20, that is, the electrical potential VB at point B is quickly raised to the high electrical potential to quickly turn on the transistor T4, and the electrical potential VG at point G can quickly jump from a high electrical potential to a low electrical potential, and then quickly turn off the driving transistor T2, so that the light-emitting device D1 can be quickly switched from a light-up state to an off state.

Figure 1:
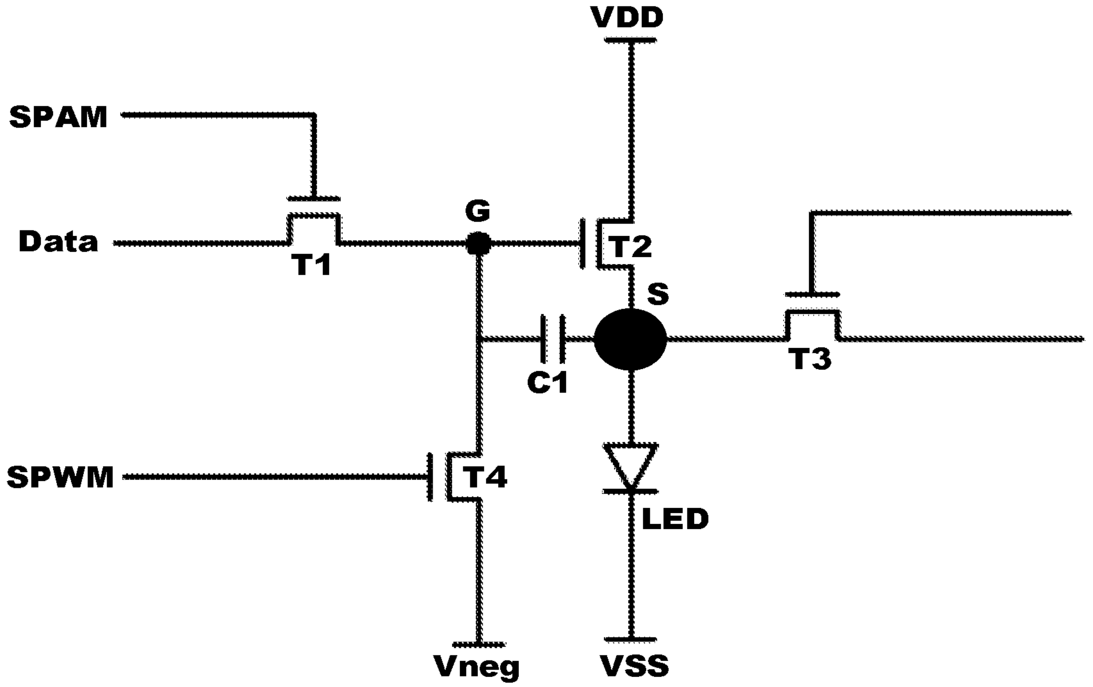
PRIOR ART FIG. 1
FIG. 1 is a first circuit principle diagram of a pixel circuit provided by a conventional technical solution.
Figure 2:
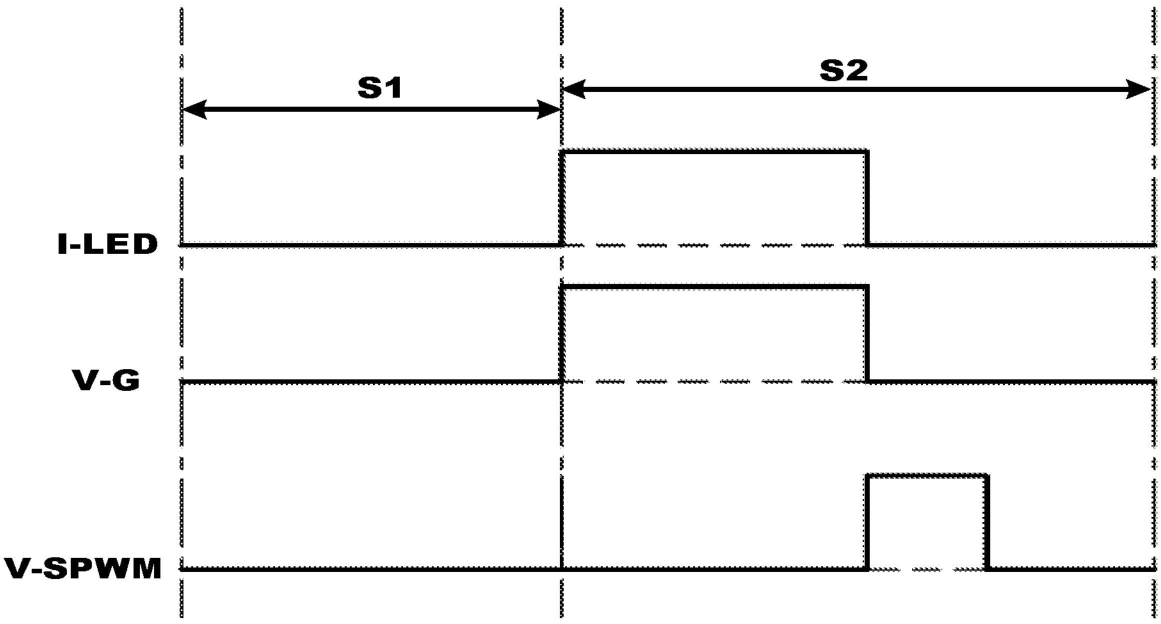
PRIOR ART FIG. 2
FIG. 2 is a time sequence diagram of the pixel circuit shown in FIG. 1.
Figure 3:
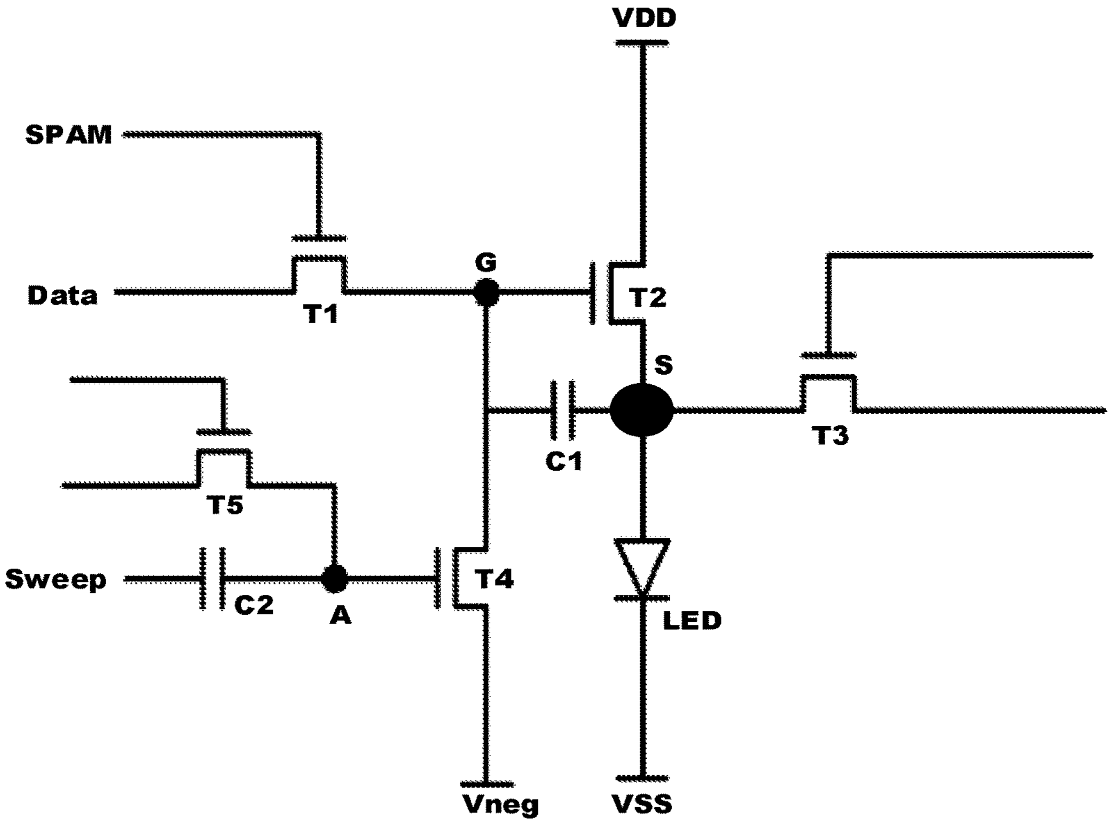
PRIOR ART FIG. 3
FIG. 3 is a schematic diagram of a second circuit of the pixel circuit provided by the conventional technical solution.
Figure 4:
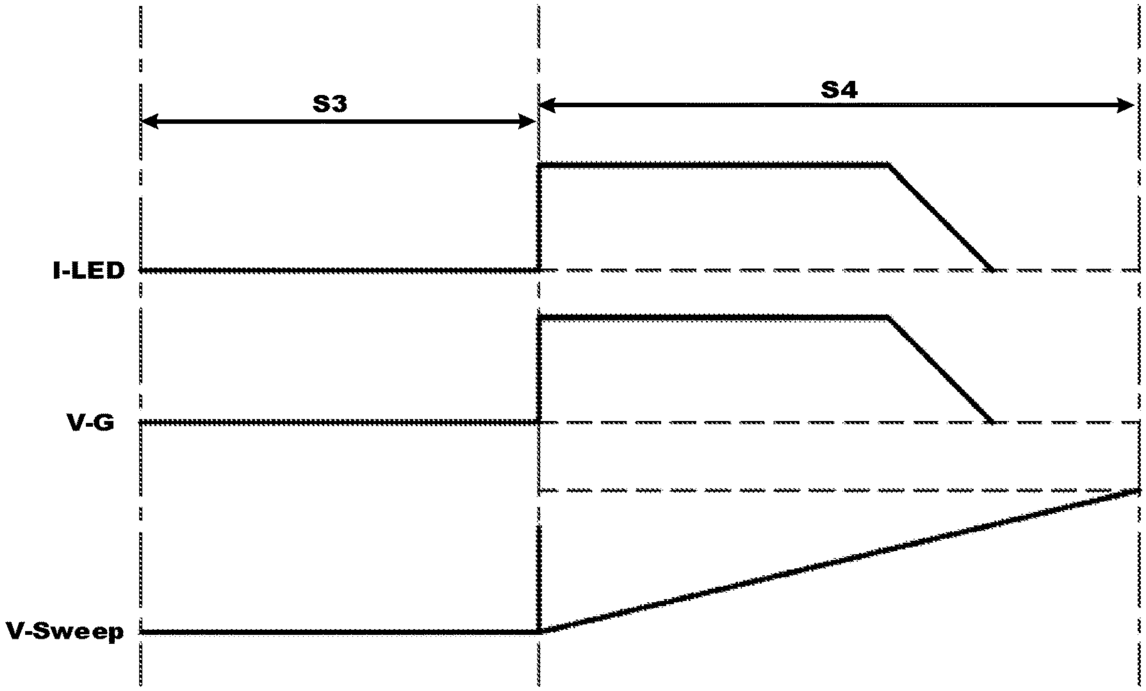
PRIOR ART FIG. 4
FIG. 4 is a time sequence diagram of the pixel circuit shown in FIG. 3.

Compared with FIG. 4, the electrical potential V-Sweep of the triangular wave control signal Sweep and the light-emitting current I-LED of FIG. 9 have steeper falling edges. That is to say, the pixel circuit shown in FIG. 5 can more accurately control light-emitting time or duration of the display time.

At the same time, due to the Schmitt trigger 20 with high hysteresis characteristics is disposed in the pixel circuit shown in FIG. 5*i* That is, when the input voltage of the Schmitt trigger 20 rises to its forward threshold voltage, an output electrical potential of the Schmitt trigger 20 will be flip-flop a high electrical potential. In this way, the output electrical potential of the high electrical potential of the Schmitt trigger 20 can ignore the difference or drift of the threshold voltage of the transistor T4, and can ensure that the transistor T4 can be turned on directly. Therefore, in the pixel circuit of the present application that adopts the Schmitt trigger 20, there is no need to carefully design a compensation circuit for the threshold voltage of the transistor T4, that is, the pixel circuit with the Schmitt trigger 20 provided in the present application can realize the display function with a simpler circuit structure.

With this display function, different initial electrical potentials can be provided to point A, so that different display times can be correspondingly obtained, and high-precision gray-scale segmentation can be achieved without the need for particularly high-frequency signals.

Figure 10:
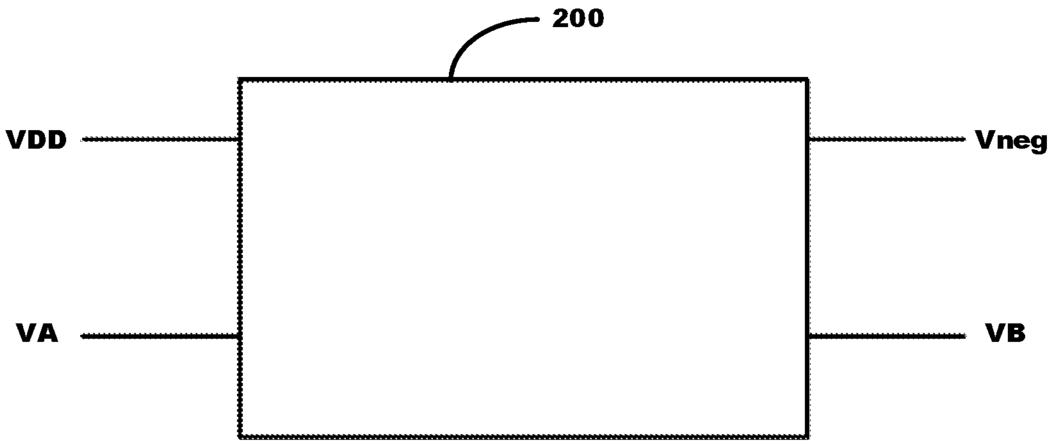
FIG. 10 is a schematic structural diagram of a light-emitting chip 200 provided by one embodiment of the application.

As shown in FIGS. 5 and 10, in one of the embodiments, this embodiment provides a display panel, which includes the pixel circuit in at least one of the above embodiments, and the pixel circuit further includes a light-emitting chip 200, wherein a Schmitt trigger 20 is integrated in the light-emitting chip 200.

It is understandable that the display panel provided in this embodiment can turn on control unit 10 more quickly to turn off the driving transistor T2 by connecting the Schmitt trigger 20 in series between an output terminal of the electrical potential modulation unit 30 and a control terminal of the display time control unit 10, to more accurately control display time or light-emitting time of the pixel circuit.

It should be noted that the light-emitting chip 200 may be a Mini-LED chip or a Micro-LED chip. As shown in FIG. 10, the light-emitting chip 200 packaged in a CMOS process may include a first pin, a second pin, a third pin, and a fourth pin, wherein the first pin can be configured to transmit the positive power signal VDD, the second pin can be configured to transmit the first reference signal Vneg, the third pin can be configured to transmit electrical potential VA of point A, and the fourth pin can be configured to transmit electrical potential VB of the point B.

In the above-mentioned embodiments, the description of each embodiment has its own focus. For parts that are not described in detail in an embodiment, reference may be made to related descriptions of other embodiments.

The pixel circuits and display panels provided by the embodiments of the application are described in detail above. Specific examples are used in this article to describe the principles and implementations of the present application. The descriptions of the above embodiments are only used to help understand the technical solution and core idea of the present application. Those of ordinary skill in the art should understand that: It is possible to modify the technical solutions recorded in the foregoing embodiments, or equivalently replace some of the technical features. These modifications or replacements do not cause the essence of the corresponding technical solutions deviates from the scope of the technical solutions of the embodiments of the present application.

What is claimed is:

1. A pixel circuit, comprising:

a driving transistor T2; and a pulse width driving module electrically connected to a gate electrode of the driving transistor T2 wherein the pulse width driving module comprises:

a display time control unit, wherein one terminal of the display time control unit is electrically connected to the gate electrode of the driving transistor T2, and wherein another terminal of the display time control unit in configured to receive a first reference signal and is configured to turn off the driving transistor T2;

an electrical potential modulation unit; and a Schmitt trigger, wherein an input terminal of the Schmitt trigger is electrically connected to the output terminal of the electrical potential modulation unit, and wherein an output terminal of the Schmitt trigger is electrically connected to a control terminal of the display time control unit, wherein the Schmitt trigger comprises:

an inverter INV1, wherein an input terminal of the inverter INV1 is electrically connected to the output terminal of the electrical potential modulation unit;

an inverter INV2, wherein an input terminal of the inverter INV2 is electrically connected to an output terminal of the inverter INV1, and wherein the output terminal of the inverter INV2 is electrically connected to the control terminal of the display time control unit; and a resistor R2, wherein one terminal of the resistor R2 is electrically connected to the input terminal of the inverter INV1, and another terminal of the resistor R2 is electrically connected to the output terminal of the inverter INV2, such that a positive feedback is formed between the input terminal of the inverter INV1 and the output terminal of the inverter INV2 through the resistor R2.

2. The pixel circuit according to claim 1, wherein the Schmitt trigger further comprises a resistor R1, wherein one terminal of the resistor R1 is electrically connected to the output terminal of the electrical potential modulation unit, and wherein another terminal of the resistor R1 is electrically connected to the input terminal of the inverter INV1.

3. The pixel circuit according to claim 1, wherein the inverter INV1 comprises:

a transistor M1, wherein one of a source electrode and a drain electrode of the transistor M1 is electrically connected to a gate electrode of the transistor M1, and is configured to receive a high electrical potential signal; and a transistor M2, wherein one of a source electrode and a drain electrode of the transistor M2 is electrically connected to another one of the source electrode and the drain electrode of the transistor M1 and the input terminal of the inverter INV2, and wherein a gate electrode is electrically connected to the output terminal of the electrical potential modulation unit, and another one of the source electrode and the drain electrode of the transistor M2 is configured to receive a first reference signal.

4. The pixel circuit according to claim 3, wherein the inverter INV2 comprises:

a transistor M3, wherein one of a source electrode and a drain electrode of the transistor M3 is electrically connected to a gate electrode of the transistor M3, and is configured to receive the high electrical potential signal; and a transistor M4, wherein one of a source electrode and a drain electrode of the transistor M4 is electrically connected to another one of the source electrode and the drain electrode of the transistor M3 and the control terminal of the display time control unit, and wherein a gate electrode of the transistor M4 is electrically connected to one of the source electrode and the drain electrode of the transistor M2, and wherein another one of the source electrode and the drain electrode of the transistor M4 is configured to receive the first reference signal.

5. The pixel circuit according to claim 1, wherein the display time control unit comprises a transistor T4, and one of a source electrode and a drain electrode of the transistor T4 is electrically connected to the gate electrode of the driving transistor T2, and wherein another one of the source electrode and the drain electrode of the transistor T4 is configured to receive the first reference signal, and wherein a gate electrode of the transistor T4 is electrically connected to the output terminal of the Schmitt trigger.

6. The pixel circuit according to claim 5, wherein the potential modulation unit comprises a capacitor C2, one terminal of the capacitor C2 is electrically connected to the input terminal of the Schmitt trigger, and another terminal of the capacitor C2 is configured to receive a triangle wave control signal.

7. The pixel circuit according to claim 6, wherein the potential modulation unit further comprises a transistor T5, and wherein one of a source electrode and a drain electrode of the transistor T5 is configured to receive an electrical potential setting signal, and a gate electrode of transistor T5 is configured to receive a pulse width control signal.

8. The pixel circuit according to claim 1, wherein the pixel circuit further comprises:

a transistor T1, wherein one of a source electrode and a drain electrode of the transistor T1 is configured to receive a data signal, and wherein a gate electrode of the transistor T1 is configured to receive a pulse amplitude control signal, and wherein another one of the source electrode and the drain electrode of the transistor T1 is electrically connected to the gate electrode of the driving transistor T2;

a transistor T3, wherein one of a source electrode and a drain electrode of the transistor T3 is configured to receive the second reference signal, and wherein the gate electrode of the transistor T3 is configured to receive the pulse amplitude control signal, and wherein another one of the source electrode and the drain electrode of the transistor T3 is electrically connected to the source electrode of the driving transistor T2;

a capacitor C1, wherein one terminal of the capacitor C1 is electrically connected to the gate electrode of the driving transistor T2, and another terminal of the capacitor C1 is electrically connected to the source electrode of the driving transistor T2; and a light-emitting device D1, wherein an anode of the light-emitting device D1 is electrically connected to the source electrode of the driving transistor T2, and wherein a cathode of the light-emitting device D1 is configured to receive a negative power supply signal;

wherein the drain electrode of the driving transistor T2 is configured to receive a positive power supply signal.

9. A display panel, comprising a pixel circuit, the pixel circuit comprising:

a driving transistor T2; and a pulse width driving module electrically connected to a gate electrode of the driving transistor T2 wherein the pulse width driving module comprises:

a display time control unit, wherein one terminal of the display time control unit is electrically connected to the gate electrode of the driving transistor T2, and wherein another terminal of the display time control unit in configured to receive a first reference signal and is configured to turn off the driving transistor T2;

an electrical potential modulation unit; and a Schmitt trigger, wherein an input terminal of the Schmitt trigger is electrically connected to the output terminal of the electrical potential modulation unit, and wherein an output terminal of the Schmitt trigger is electrically connected to a control terminal of the display time control unit, wherein the Schmitt trigger comprises:

an inverter INV1, wherein an input terminal of the inverter INV1 is electrically connected to the output terminal of the electrical potential modulation unit;

an inverter INV2, wherein an input terminal of the inverter INV2 is electrically connected to an output terminal of the inverter INV1, and wherein the output terminal of the inverter INV2 is electrically connected to the control terminal of the display time control unit; and a resistor R2, wherein one terminal of the resistor R2 is electrically connected to the input terminal of the inverter INV1, and another terminal of the resistor R2 is electrically connected to the output terminal of the inverter INV2, such that a positive feedback is formed between the input terminal of the inverter INV1 and the output terminal of the inverter INV2 through the resistor R2, wherein the pixel circuit further comprises a light-emitting chip, and wherein the Schmitt trigger is integrated in the light-emitting chip.

10. The display panel according to claim 9, wherein the Schmitt trigger further comprises a resistor R1, wherein one terminal of the resistor R1 is electrically connected to the output terminal of the electrical potential modulation unit, and wherein another terminal of the resistor R1 is electrically connected to the input terminal of the inverter INV1.

11. The display panel according to claim 9, wherein the inverter INV1 comprises:

a transistor M1, wherein one of a source electrode and a drain electrode of the transistor M1 is electrically connected to a gate electrode of the transistor M1, and is configured to receive a high electrical potential signal; and a transistor M2, wherein one of a source electrode and a drain electrode of the transistor M2 is electrically connected to another one of the source electrode and the drain electrode of the transistor M1 and the input terminal of the inverter INV2, and wherein a gate electrode is electrically connected to the output terminal of the electrical potential modulation unit, and another one of the source electrode and the drain electrode of the transistor M2 is configured to receive a first reference signal.

12. The display panel according to claim 11, wherein the inverter INV2 comprises:

a transistor M3, wherein one of a source electrode and a drain electrode of the transistor M3 is electrically connected to a gate electrode of the transistor M3, and is configured to receive the high electrical potential signal; and a transistor M4, wherein one of a source electrode and a drain electrode of the transistor M4 is electrically connected to another one of the source electrode and the drain electrode of the transistor M3 and the control terminal of the display time control unit, and wherein a gate electrode of the transistor M4 is electrically connected to one of the source electrode and the drain electrode of the transistor M2, and wherein another one of the source electrode and the drain electrode of the transistor M4 is configured to receive the first reference signal.

13. The display panel according to claim 9, wherein the display time control unit comprises a transistor T4, and one of a source electrode and a drain electrode of the transistor T4 is electrically connected to the gate electrode of the driving transistor T2, and wherein another one of the source electrode and the drain electrode of the transistor T4 is configured to receive the first reference signal, and wherein a gate electrode of the transistor T4 is electrically connected to the output terminal of the Schmitt trigger.

14. The display panel according to claim 13, wherein the potential modulation unit comprises a capacitor C2, one terminal of the capacitor C2 is electrically connected to the input terminal of the Schmitt trigger, and another terminal of the capacitor C2 is configured to receive a triangle wave control signal.

15. The display panel according to claim 14, wherein the potential modulation unit further comprises a transistor T5, and wherein one of a source electrode and a drain electrode of the transistor T5 is configured to receive an electrical potential setting signal, and a gate electrode of transistor T5 is configured to receive a pulse width control signal.

16. The display panel according to claim 9, wherein the pixel circuit further comprises:

a transistor T1, wherein one of a source electrode and a drain electrode of the transistor T1 is configured to receive a data signal, and wherein a gate electrode of the transistor T1 is configured to receive a pulse amplitude control signal, and wherein another one of the source electrode and the drain electrode of the transistor T1 is electrically connected to the gate electrode of the driving transistor T2;

a transistor T3, wherein one of a source electrode and a drain electrode of the transistor T3 is configured to receive the second reference signal, and wherein the gate electrode of the transistor T3 is configured to receive the pulse amplitude control signal, and wherein another one of the source electrode and the drain electrode of the transistor T3 is electrically connected to the source electrode of the driving transistor T2; and a capacitor C1, wherein one terminal of the capacitor Cl is electrically connected to the gate electrode of the driving transistor T2, and another terminal of the capacitor C1 is electrically connected to the source electrode of the driving transistor T2.

17. The display panel according to claim 16, wherein an anode of the light-emitting device is electrically connected to the source electrode of the driving transistor, and wherein a cathode of the light-emitting device is configured to receive the negative power signal, and wherein the drain electrode of the driving transistor is configure to receive the positive power signal.

18. The display panel according to claim 9, wherein the light-emitting chip comprises a first pin, a second pin, a third pin, and a fourth pin.

* * * * *